United States Patent [19]

Lopez

[11] 4,196,015
[45] Apr. 1, 1980

[54] REWETTING SOLUTION AND METHOD FOR ALUMINIZING IMAGE DISPLAY FACEPLATES

[75] Inventor: Hugo A. Lopez, Glendale Heights, Ill.

[73] Assignee: Zenith Radio Corporation, Glenview, Ill.

[21] Appl. No.: 935,032

[22] Filed: Aug. 18, 1978

[51] Int. Cl.² .......................... B05D 5/06; B05D 5/12
[52] U.S. Cl. .......................... 106/287.24; 106/287.34; 427/64; 427/68; 427/344; 252/313 S
[58] Field of Search ............... 106/287.34; 252/313 S; 427/64, 68, 344, 419 B

[56] References Cited

U.S. PATENT DOCUMENTS

| | | | |
|---|---|---|---|
| 2,696,444 | 12/1954 | Rossin | 106/287.34 |
| 3,099,763 | 7/1963 | Gentry | 427/64 |
| 3,591,518 | 7/1971 | McMillan | 252/313 S |
| 3,677,954 | 7/1972 | Nakajima | 252/313 S |
| 3,752,679 | 8/1973 | Moore | 427/344 |
| 3,920,578 | 11/1975 | Yates | 427/68 |
| 3,940,508 | 2/1976 | Wilcox | 106/287.34 |

*Primary Examiner*—Michael F. Esposito
*Attorney, Agent, or Firm*—Ralph E. Clarke, Jr.

[57] ABSTRACT

This invention relates to improvements in the art of aluminizing the phosphor screens of image display devices such as television cathode ray picture tubes. A solution for rewetting a phosphor-bearing image display faceplate prior to aluminizing comprises a highly alkaline aqueous dispersion of a siliceous coating agent and a surfactant. The solution according to the invention includes an acidic pH-lowering substance in an amount sufficient to adjust pH to a neutral range.

4 Claims, No Drawings

REWETTING SOLUTION AND METHOD FOR ALUMINIZING IMAGE DISPLAY FACEPLATES

BACKGROUND OF THE INVENTION

This invention relates to image displays such as television cathode ray picture tubes, and is concerned specifically with improved rewetting solution for use in the process of aluminizing image display faceplates.

The luminescing material, commonly a layer of one or more phosphors of different color emissions deposited on the inner surface of an image display faceplate, is usually "aluminized." The aluminizing process comprises the depositing of an electron-pervious film of aluminum on the phosphors. The film increases the brightness of the display by acting as a mirror to reflect toward the viewer the light produced by the phosphors when activated. The film typically also carries a high-voltage charge to act as an electron-attractive ultor electrode for the display. The thickness of the film is typically about 2,000 Angstroms.

For maximum display brightness and brightness uniformity, it is essential that the aluminum film be as smooth and as mirror-like as possible, and devoid of blemishes such as holes or blisters. Other necessary qualities include firm adherence of the film to the phosphor layer, and uniform thickness of the film for uniform electron penetration.

A problem arises in achieving these qualities primarily because of the unsmooth characteristics of the phosphor layer. As is well-known in the art, the problem is largely resolved by the depositing of a film of an organic material such as a lacquer on the phosphor layer. The film acts to fill in uneven areas of the phosphor layer, providing a smooth surface upon which the aluminum film can be deposited and take on the smooth characteristic of the organic film. It is common practice to remove the organic film by baking the tube following the aluminizing step.

It has proved difficult in manufacture to attain firm adherence of aluminum films so deposited. Physical and thermal shock during manufacture and when transporting, can detach appreciable sections of an inadherent film. A drop of water falling on the surface of the film during the manufacturing process can also detach a section of the film. The consequent difference in brightness of such non-aluminized areas is highly perceptible to the viewer. As a result, the image display, whether a cathode ray picture tube or an image display panel, must be rejected. In addition to poor adherence, highly visible holes and blisters can develop in the aluminum film as a result of the presence of dirt on the phosphor layer before the organic film is deposited.

To promote firm adherence of the phosphor to the glass of the viewing screen, it is a common, well-known practice to "prewet," or "precoat" the phosphor-bearing screen prior to the application of the phosphor with an aqueous slurry which includes a predetermined percentage of a silica compound and insoluble polyvinyl alcohol. To promote attachment of the aluminum film to the phosphor, it is also a known practice to "rewet" the deposited phosphor with an adherence-promoting solution commonly comprising a solution of which a silicate is the main constituent. Rewetting solutions are typically highly alkaline, with a pH value in the range of 10 to 13. The high alkalinity is attributable to the siliceous component commonly used. Such alkaline solutions have proved to be less than satisfactory in promoting adherence of the aluminum film.

Wilcox, in U.S. Pat. No. 3,940,508 discloses a precoat layer consisting of a highly insoluble, low-molecular-weight polyvinyl alcohol which is thinly dispersed and dried upon the inner surface of a television picture tube faceplate panel. The precoat is applied in the form of an aqueous slurry in which the polyvinyl alcohol is rendered highly insoluble by adjusting the pH value of the slurry to a value of less than about 3. The precoat, when uniformly dispersed and dried, is alleged to provide a highly adherent layer on the glass faceplace to which the phosphor is in turn said to be highly adherent.

The problem of poor adherence of the aluminum film is resolved according to the present invention by means of an improved solution and method for rewetting the phosphor layer prior to the application of the organic film and the aluminizing film.

OBJECTS OF THE INVENTION

It is a general object to improve picture quality of image display devices such as television picture tubes that utilize an aluminum film for enhancing image brightness.

It is another object of the invention to provide means and method for enhancing the reflectivity and the reflectance uniformity of the aluminum film.

It is a more specific object of the invention to provide a rewetting solution and method for the aluminizing process that will enhance aluminum film quality and adherence while increasing manufacturing yield.

DESCRIPTION OF THE PREFERRED EMBODIMENTS

The rewetting means according to the invention comprises, essentially, a highly alkaline aqueous dispersion of a siliceous coating agent and a surfactant including an acidic pH-lowering substance in an amount sufficient to adjust the pH to a neutral range of 6 to 8.

Examples of specific rewetting formulations according to the invention which have been successfully used in the manufacture of television picture tubes are set forth in the following.

EXAMPLE 1

One suitable rewetting solution according to the invention is compounded as follows. The amount of solution described is that which can be conveniently mixed in a 55-gallon drum. The amounts can be scaled up to provide any necessary quantity for production.

Pour into the drum 400 lb. of deionized water at a temperature of 80° F. to 84° F., preferably 82° F.

Add 1.3 liters of 1 percent acetic acid

Stir for 5 minutes

Check pH; the pH should be 3.7 to 4.3

Add 4,960 milliliters of a 30 weight percent of an aqueous colloidal dispersion of silica particles Stir for five minutes. Check the pH; the pH should be about 6.0 to 7.8, and preferably, about 6.2 to 7.8

Add 50 milliliters of a surfactant diluted to 10 percent

Stir for 3 minutes.

The rewetting solution according to the Example 1 embodiment of the invention is now ready for use.

The Example 1 solution according to the invention comprises an aqueous colloidal dispersion of silica particles, said particles comprising about 0.5 to 1.5 weight percent, preferably 0.96 weight percent; a non-ionic surfactant comprising about 0.001 to 0.004 weight percent, preferably 0.00268 weight percent; and an acidic pH-lowering substance in an amount sufficient to adjust pH to about 6.0 to 7.8, and preferably, about 6.2 to 7.8. The pH-lowering substance is preferably acetic acid.

The aqueous colloidal dispersion of silica particles acts primarily as a coating and adherent agent for the organic film and the aluminum film that is to be deposited thereon. The colloidal dispersion medium is preferably one that is independent of pH to provide stability in the neutral pH range; that is, precipitation will not occur when an acidifying agent is added to the medium. Ludox(TM) AM supplied by E. I. duPont de Nemours & Co., Inc. of Wilmington, Delaware has been found to be a suitable medium.

The non-ionic surface-active agent, or "surfactant," may comprise a modified polyethoxy adduct. By way of example, Triton(TM) CF-54, supplied by Rohm & Haas Company, Philadelphia, Pennsylvania, has been determined to be an effective surfactant.

The acidic pH-lowering substance may comprise a suitable dilution of an acid such as acetic or phosphoric, but preferably comprises acetic acid in a one-percent aqueous solution. The glacial concentration of acetic acid may be used provided that it is diluted accordingly.

EXAMPLE 2

Pour into a 55-gallon drum 400 lb. of deionized water at a temperature of 80° F. to 84° F., preferably 82° F.

Add 4,312 milliliters of a 28 weight percent mixture of potassium silicate

Add slowly while stirring 2,500 milliliters of a 25 percent solution of acetic acid. Stir for 10 minutes Check pH; the pH should be about 6.8 to 8.0, and preferably, about 6.8 to 7.8

Add 239 milliliters of surfactant diluted to 10 percent Mix for three minutes.

The rewetting solution according to the Example 2 embodiment of the invention is now ready for use.

The Example 2 solution according to the invention comprises an aqueous solution of potassium silicate, said potassium silicate comprising about 0.3 to 1.0 weight percent, preferably 0.65 weight percent; a nonionic surfactant comprising about 0.01 to 0.02 weight percent, preferably 0.013 weight percent; and an acidic pH-lowering substance in an amount sufficient to adjust pH to about 6.8 to 8.0, preferably about 6.8 to 7.8. The pH-lowering substance may comprise a suitable dilution of an acid such as acetic or phosphoric, but is preferably acetic acid.

APPLICATION

Rewetting solutions according to the invention are applied to the faceplate following the depositing of the phosphors. The faceplate may be either wet or dry for application of the rewetting solutions according to the invention. Following the application of a rewetting solution, an organic material, typically a lacquer, is applied as a separate layer jhaving a thickness in microns. The lacquer is dried, the aluminum film is deposited, and the lacquer is baked out, leaving the aluminum film adherent to the phosphor. The processes of luminescent material deposition and application of a rewet solution, the lacquer, the aluminum film, and the intermediate steps are all well-known to those skilled in the art of manufacturing image display devices and need no further exposition.

The exact means by which the rewetting solutions and method according to the invention enhance the adherence and quality of the aluminizing layer to the phosphor layer is not known. Prior art rewetting solutions normally have pH values very high on the alkaline side due to the siliceous components; that is, a pH in the range of 10 to 13. Solutions of such alkalinity have proved to be often productive of thin, inadherent films having many blemishes. In consequence, defects were numerous and yields were low. By lowering the pH of the rewetting solutions according to the invention to fall within the neutral pH-limits defined heretofore, the subsequent aluminum film deposit was unexpectedly made a great deal more adherent. Also, blemishes in the organic film and aluminum film are far fewer and yields much higher, resulting in significant reductions in manufacturing costs. Reflectance and uniformity of reflectance are excellent, and the thickness of the aluminum film is uniform. The aluminum film is resistant to thermal or physical shock and is not dislodged by normal handling during manufacture and shipping. The process has been used in the manufacture of more than one million television picture tubes.

It must be recognized that changes may be made in the above-described solutions and the proportions thereof without departing from the true spirit and scope of the invention herein involved, and it is intended that the subject matter in the above depiction shall be interpreted as illustrative and not in a limiting sense.

I claim:

1. A solution for rewetting a phosphor-bearing image display faceplate prior to aluminizing consisting essentially of:
    (1) an aqueous colloidal dispersion of silica particles, said particles comprising about 0.5 to 1.5 weight percent;
    (2) a nonionic surfactant comprising about 0.001 to 0.004 weight percent; and
    (3) an acidic pH-lowering substance in an amount sufficient to adjust pH to about 6.2 to 7.8.

2. The solution according to claim 1 wherein the pH-lowering substance is acetic acid.

3. A solution for rewetting a phosphor-bearing image display faceplate prior to aluminizing consisting essentially of
    (1) an aqueous solution of potassium silicate, said potassium silicate comprising about 0.3 to 1.0 weight percent;
    (2) a nonionic surfactant comprising about 0.01 to 0.02 weight percent; and,
    (3) an acidic pH-lowering substance in an amount sufficient to adjust pH to about 6.8 to 7.8.

4. The solution according to claim 3 wherein the pH-lowering substance is acetic acid.

* * * * *